(12) United States Patent
Han et al.

(10) Patent No.: US 9,019,644 B2
(45) Date of Patent: Apr. 28, 2015

(54) SYSTEMS AND METHODS FOR DATA ADDRESSING IN A STORAGE DEVICE

(75) Inventors: Yang Han, Sunnyvale, CA (US); Zongwang Li, San Jose, CA (US); Shaohua Yang, San Jose, CA (US); Wu Chang, Santa Clara, CA (US)

(73) Assignee: LSI Corporation, San Jose, CA (US)

( * ) Notice: Subject to any disclaimer, the term of this patent is extended or adjusted under 35 U.S.C. 154(b) by 781 days.

(21) Appl. No.: 13/113,219

(22) Filed: May 23, 2011

(65) Prior Publication Data
US 2012/0300332 A1   Nov. 29, 2012

(51) Int. Cl.
| | | |
|---|---|---|
| G11B 5/012 | (2006.01) | |
| G11B 5/09 | (2006.01) | |
| G11B 20/18 | (2006.01) | |
| G11B 20/12 | (2006.01) | |

(52) U.S. Cl.
CPC ........ G11B 5/012 (2013.01); *G11B 2020/1222* (2013.01); *G11B 2020/1288* (2013.01); G11B 5/09 (2013.01); *G11B 2220/2516* (2013.01); G11B 20/1217 (2013.01); G11B 20/1833 (2013.01); G11B 20/1866 (2013.01); *G11B 2020/1267* (2013.01)

(58) Field of Classification Search
CPC ............... G11B 2020/1288; G11B 2020/1222; G11B 20/1866
USPC ...................................... 360/49, 55
See application file for complete search history.

(56) References Cited

U.S. PATENT DOCUMENTS

| | | |
|---|---|---|
| 6,366,418 B1 * | 4/2002 | McEwen et al. ................ 360/48 |
| 6,625,157 B2 | 9/2003 | Niu et al. |
| 6,763,226 B1 | 7/2004 | McZeal |
| 6,968,153 B1 | 11/2005 | Heinonen et al. |
| 7,058,734 B2 | 6/2006 | Chen et al. |
| 7,130,426 B1 | 10/2006 | Cha et al. |
| 7,386,672 B2 | 6/2008 | Casazza |
| 7,523,262 B2 | 4/2009 | Casazza |
| 2001/0034714 A1 | 10/2001 | Terao et al. |
| 2001/0184318 | 10/2001 | Terao et al. |

(Continued)

OTHER PUBLICATIONS

U.S. Appl. No. 10/549,270, filed Aug. 12, 2010, Okauchi et al.

(Continued)

*Primary Examiner* — Mardochee Chery
(74) *Attorney, Agent, or Firm* — Hamilton DeSanctis & Cha (57) ABSTRACT

Various embodiments of the present invention provide systems and methods for format efficient data storage. As an example, a data storage device is described that includes: a storage medium, a read/write head assembly, and a read channel circuit. The read/write head assembly is disposed in relation to the storage medium and operable to sense information corresponding to an encoded codeword. The read channel circuit is operable to receive the encoded codeword. The read channel circuit includes a missing symbols insertion circuit, a codeword de-scramble circuit, an address insertion circuit, and a data decoder circuit. The missing symbols insertion circuit, the codeword de-scramble circuit, and the address insertion circuit together are operable to pad a derivative of the encoded codeword with a plurality of symbols, to descramble the derivative of the encoded codeword, and to insert address information corresponding to the derivative of the encoded codeword to yield a modified encoded codeword. The data decoder circuit is operable to apply a data decoding algorithm to the modified encoded codeword to yield a decoded output.

20 Claims, 9 Drawing Sheets

(56) References Cited

U.S. PATENT DOCUMENTS

| | | |
|---|---|---|
| 2002/0116575 A1 | 8/2002 | Toyomura et al. |
| 2002/0184318 A1 | 12/2002 | Pineau |
| 2003/0046274 A1 | 3/2003 | Ericson et al. |
| 2003/0077068 A1* | 4/2003 | Lin et al. .................. 386/68 |
| 2003/0110484 A1 | 6/2003 | Famolari |
| 2003/0216136 A1 | 11/2003 | Mcbrearty et al. |
| 2004/0044725 A1 | 3/2004 | Bell et al. |
| 2004/0110468 A1 | 6/2004 | Perlman |
| 2004/0204063 A1 | 10/2004 | Van Erlach |
| 2004/0252985 A1 | 12/2004 | Nonaka et al. |
| 2005/0021418 A1 | 1/2005 | Marcus et al. |
| 2005/0073522 A1 | 4/2005 | Aholainen |
| 2005/0107120 A1 | 5/2005 | Yueh |
| 2005/0129385 A1 | 6/2005 | Speasl et al. |
| 2005/0182858 A1 | 8/2005 | Lo et al. |
| 2005/0210101 A1 | 9/2005 | Janik |
| 2005/0289216 A1 | 12/2005 | Myka et al. |
| 2006/0059094 A1 | 3/2006 | Oh et al. |
| 2006/0227446 A1* | 10/2006 | Elliott et al. .................. 360/39 |
| 2007/0128899 A1 | 6/2007 | Mayer |
| 2009/0055423 A1 | 2/2009 | Minakata et al. |
| 2009/0061775 A1 | 3/2009 | Warren et al. |
| 2010/0203830 A1 | 8/2010 | Warren et al. |
| 2011/0058631 A1* | 3/2011 | Tan et al. .................. 375/340 |

OTHER PUBLICATIONS

U.S. Appl. No. 11/665,985, filed Oct. 7, 2010, Electronics and Telecommunications.
U.S. Appl. No. 12/280,744, filed Jan. 10, 2008, Warren et al.
U.S. Appl. No. 12/280,779, filed Jan. 10, 2008, Warren et al.
U.S. Appl. No. 12/280,782, filed Apr. 17, 2008, Warren et al.
U.S. Appl. No. 12/280,783, filed Jan. 10, 2008, Warren et al.
U.S. Appl. No. 12/280,784, Jan. 10, 2008, Warren et al.
U.S. Appl. No. 12/280,787, filed Jan. 10, 2008, Warren et al.
U.S. Appl. No. 13/113,219, filed May 23, 2011, Han, Yang et al.

* cited by examiner

Fig. 8f

SYSTEMS AND METHODS FOR DATA ADDRESSING IN A STORAGE DEVICE

BACKGROUND OF THE INVENTION

The present inventions are related to systems and methods for data storage, and more particularly to systems and methods for addressing data.

Storage devices receive data to be stored and maintains that data until later retrieved. Such storage and later retrieval relies on data addresses to assure the appropriate data is retrieved. In some cases, the addressing for a hard disk drive includes cylinder, head and sector information. In other cases, logical block addressing is used to address information by a single sector number. In such cases, firmware in a host machine governing operation of the hard disk converts a cylinder, head and sector data set into a logical block address. Such addressing approaches utilize storage space on a hard disk, and thus reduce the effective storage area.

Hence, for at least the aforementioned reasons, there exists a need in the art for advanced systems and methods for addressing.

BRIEF SUMMARY OF THE INVENTION

The present inventions are related to systems and methods for data storage, and more particularly to systems and methods for addressing data.

Various embodiments of the present invention provide data storage devices that include: a storage medium, a read/write head assembly, and a read channel circuit. The read/write head assembly is disposed in relation to the storage medium and operable to sense information corresponding to an encoded codeword. The read channel circuit is operable to receive the encoded codeword. The read channel circuit includes a missing symbols insertion circuit, a codeword de-scramble circuit, an address insertion circuit, and a data decoder circuit. The missing symbols insertion circuit, the codeword de-scramble circuit, and the address insertion circuit together are operable to pad a derivative of the encoded codeword with a plurality of symbols, to de-scramble the derivative of the encoded codeword, and to insert address information corresponding to the derivative of the encoded codeword to yield a modified encoded codeword. The data decoder circuit is operable to apply a data decoding algorithm to the modified encoded codeword to yield a decoded output.

In some instances of the aforementioned embodiments, the data storage device further includes a data detector circuit operable to perform a data detection algorithm on the encoded codeword to yield a detected output. The detected output is the derivative of the encoded codeword. In some such instances, the detected output is a first detected output, the data detector circuit is a first data detector circuit, the codeword de-scramble circuit is a first codeword de-scramble circuit, and the data decoder circuit is a first data decoder circuit. In such instances, the data storage device further includes a codeword scramble circuit, a second data detector circuit, a second codeword de-scramble circuit, and a second data decoder circuit. The codeword scramble circuit operable to scramble the decoded output to yield a scrambled output. The second data detector circuit is operable to perform the data detection algorithm on the scrambled output to yield a second a detected output. The second codeword de-scramble circuit is operable to reverse the scrambling applied by the codeword scramble circuit to yield a de-scrambled output. The second data decoder circuit is operable to apply the data decoding algorithm to the de-scrambled output yield a data output.

In various instances of the aforementioned embodiments, the data storage device further comprises an address efficient data encoder circuit operable to calculate parity data based at least in part on a user data set and the address information, and to remove the address information to yield an address reduced codeword. In some cases, the data storage device further includes a codeword scramble circuit operable to scramble the address reduced codeword to yield the encoded codeword.

In one or more instances of the aforementioned embodiments, the missing symbols insertion circuit is operable to pad the derivative of the encoded codeword with a plurality of symbols to yield a padded codeword, the codeword de-scramble circuit is operable to de-scramble the padded codeword to yield a de-scrambled codeword, and the address insertion circuit is operable to insert the address information over one or more of the plurality of symbols to yield the modified encoded codeword. The codeword de-scramble circuit may be operable to perform both a global de-scrambling process and a local de-scrambling process.

In other instances of the aforementioned embodiments, the missing symbols insertion circuit is operable to pad the derivative of the encoded codeword with a plurality of symbols to yield a padded codeword, the codeword de-scramble circuit is operable to perform both a local de-scramble process and a global de-scramble process on the padded codeword to yield a de-scrambled codeword, and the address insertion circuit is operable to insert the address information over one or more of the plurality of symbols to yield the modified encoded codeword. In yet other instances of the aforementioned embodiments, the missing symbols insertion circuit is operable to pad the derivative of the encoded codeword with a plurality of symbols to yield a padded codeword, the address insertion circuit is operable to insert the address information over one or more of the plurality of symbols to yield an address modified codeword, and the codeword de-scramble circuit is operable to de-scramble the padded codeword to yield a de-scrambled codeword.

Other embodiments of the present invention provide address efficient data read circuits. The data read circuits include a data detector circuit, a combination of a missing symbols insertion circuit, a codeword de-scramble circuit, and an address insertion circuit, and a data decoder circuit. The data detector circuit is operable to receive an encoded codeword to yield a detected codeword. The encoded codeword includes parity information calculated based on both user data and address data, and the encoded codeword has address data removed. The combination of a missing symbols insertion circuit, the codeword de-scramble circuit, and the address insertion circuit that together are operable to receive the detected codeword, to pad the detected codeword with a plurality of symbols, to de-scramble the detected codeword, and to insert the address data corresponding to yield a modified codeword. The data decoder circuit is operable to apply a data decoding algorithm to the modified codeword to yield a decoded output.

Yet other embodiments of the present invention provide methods for format efficient data storage. Such methods include: receiving an encoded codeword that has parity information calculated based on both user data and address data, but has the address data removed; padding a derivative of the encoded codeword with a plurality of symbols, de-scrambling the derivative of the encoded codeword, and inserting address information corresponding to the derivative of the encoded codeword to yield a modified encoded codeword; and decoding the modified encoded codeword to yield a decoded output.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present inventions are related to systems and methods for data storage, and more particularly to systems and methods for addressing data.

Various embodiments of the present invention provide a mechanism for addressing data on a storage medium that reduces the amount of area on the storage medium dedicated to holding the address. In some particular embodiments of the present invention, a logical block address is incorporated in an encoding algorithm applied to data to be stored to a storage medium to yield an encoded data set. After encoding, the logical block address information is removed from the encoded data set to yield a reduced data set that is ultimately written to the storage medium. When reading the reduced data set from the storage medium, the logical block address is added to the reduced data set to create an expanded data set that corresponds to the encoded data set, and a decoding process is applied to yield the originally prepared data set.

Figure 1:
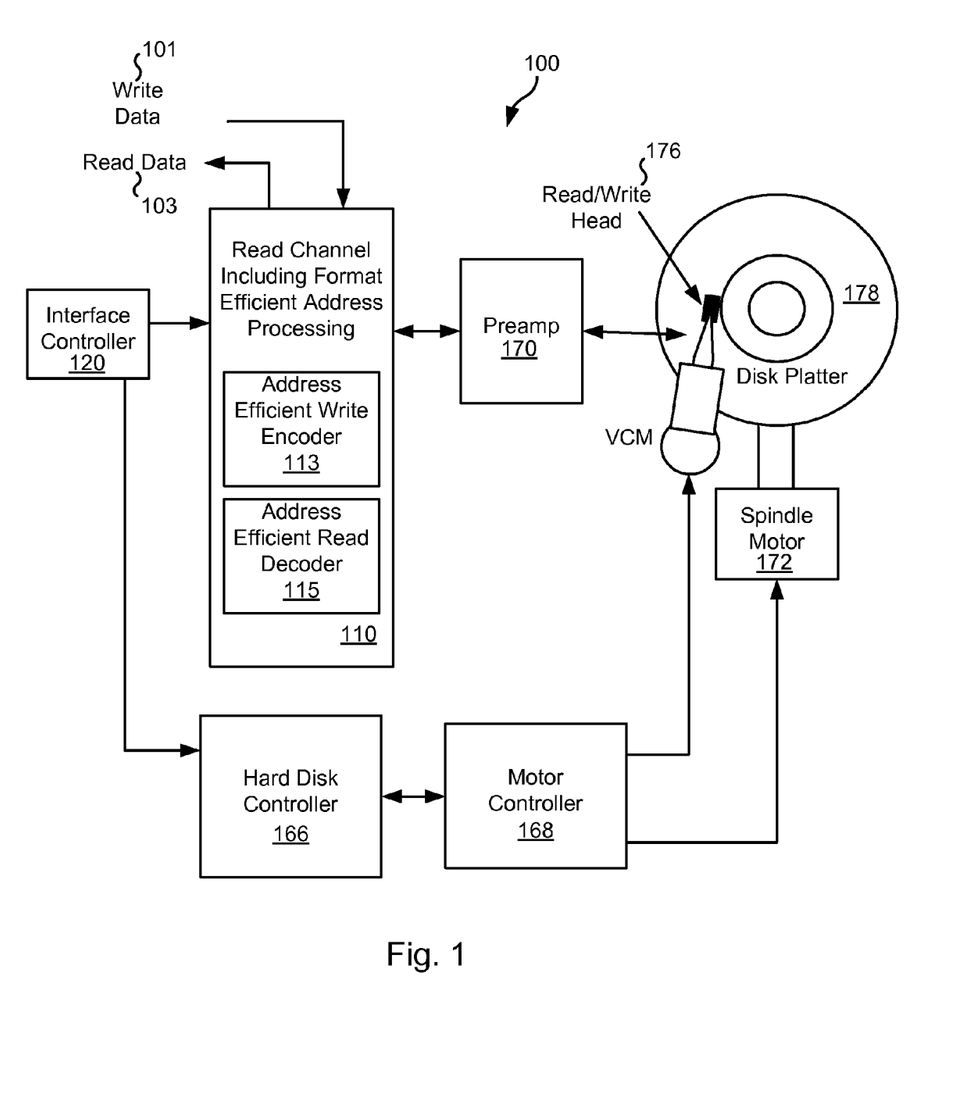
FIG. 1 depicts a storage system including format efficient address processing in accordance with some embodiments of the present invention.

Turning to FIG. 1, a storage system 100 including a read channel circuit 110 with a format efficient address processing is shown in accordance with some embodiments of the present invention. Storage system 100 may be, for example, a hard disk drive. Storage system 100 also includes a preamplifier 170, an interface controller 120, a hard disk controller 166, a motor controller 168, a spindle motor 172, a disk platter 178, and a read/write head assembly 176. Interface controller 120 controls addressing and timing of data to/from disk platter 178. The data on disk platter 178 consists of groups of magnetic signals that may be detected by read/write head assembly 176 when the assembly is properly positioned over disk platter 178. In one embodiment, disk platter 178 includes magnetic signals recorded in accordance with either a longitudinal or a perpendicular recording scheme.

In a typical read operation, read/write head assembly 176 is accurately positioned by motor controller 168 over a desired data track on disk platter 178. The desired track is identified in part using the enhanced servo data processing circuit. Motor controller 168 both positions read/write head assembly 176 in relation to disk platter 178 and drives spindle motor 172 by moving read/write head assembly to the proper data track on disk platter 178 under the direction of hard disk controller 166. Spindle motor 172 spins disk platter 178 at a determined spin rate (RPMs). Once read/write head assembly 178 is positioned adjacent the proper data track, magnetic signals representing data on disk platter 178 are sensed by read/write head assembly 176 as disk platter 178 is rotated by spindle motor 172. The sensed magnetic signals are provided as a continuous, minute analog signal representative of the magnetic data on disk platter 178. This minute analog signal is transferred from read/write head assembly 176 to read channel circuit 110 via preamplifier 170. Preamplifier 170 is operable to amplify the minute analog signals accessed from disk platter 178. In turn, read channel circuit 110 decodes and digitizes the received analog signal to recreate the information originally written to disk platter 178. This data is provided as read data 103 to a receiving circuit. A write operation is substantially the opposite of the preceding read operation with write data 101 being provided to read channel circuit 110. This data is then encoded and written to disk platter 178.

The data written to disk platter 178 is encoded by an address efficient write encoder circuit 113. The data read from disk platter 178 is decoded by an address efficient read decoder circuit 115. The combination of address efficient write encoder circuit 113 and address efficient read decoder circuit 115 may be implemented and/or operate similar to that described below in relation to FIGS. 2-6.

It should be noted that storage system 100 may be integrated into a larger storage system such as, for example, a RAID (redundant array of inexpensive disks or redundant array of independent disks) based storage system. It should also be noted that various functions or blocks of storage system 100 may be implemented in either software or firmware, while other functions or blocks are implemented in hardware.

Figure 2:
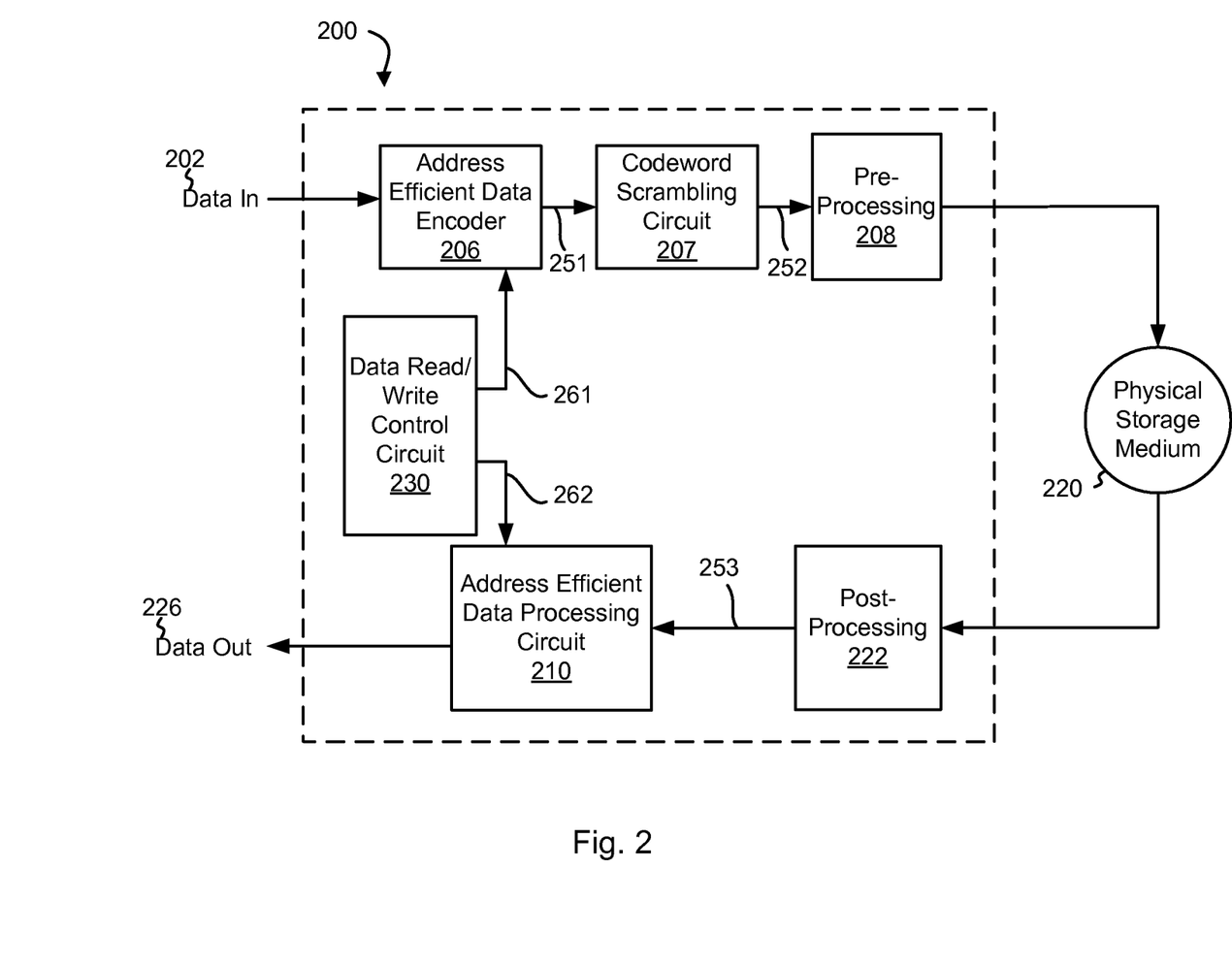
FIG. 2 depicts a data storage channel including an address efficient data encoder circuit and an address efficient data processing circuit in accordance with some embodiments of the present invention.
Figure 4A:
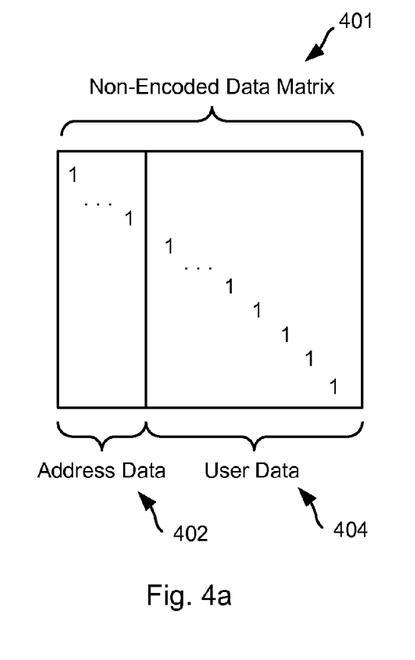
FIGS. 4a-4c graphically depict an example of (a) a non-encoded data set including address data and user data, (b) a full length encoded data set including parity data based on both the address data and the user data, and (c) a reduced data set including the user data and the parity data that may be processed in accordance with one or more embodiments of the present invention.

Turning to FIG. 2, a data storage channel 200 including an address efficient data encoder circuit 206 and an address efficient data processing circuit 210 is shown in accordance with some embodiments of the present invention. Data storage channel 200 includes an address efficient data encoder circuit 206 that receives a data input 202 comprised of user data. Address data 261 indicating an address of the data to be stored is provided from a data read/write control circuit 230 to address efficient data encoder circuit 206. Data read/write control circuit 230 is a controller circuit operable to provide addressing information during both read and write phases. Turning to FIG. 4a, a data set 401 depicted as a non-encoded data matrix is shown. Data set 401 includes address data 402 and user data 404. In one particular embodiment of the present invention, address data 402 is logical block address (LBA) data as is known in the art. Based upon the disclosure provided herein, one of ordinary skill in the art will recognize a variety of address data that may be used in relation to different embodiments of the present invention.

Figure 4B:
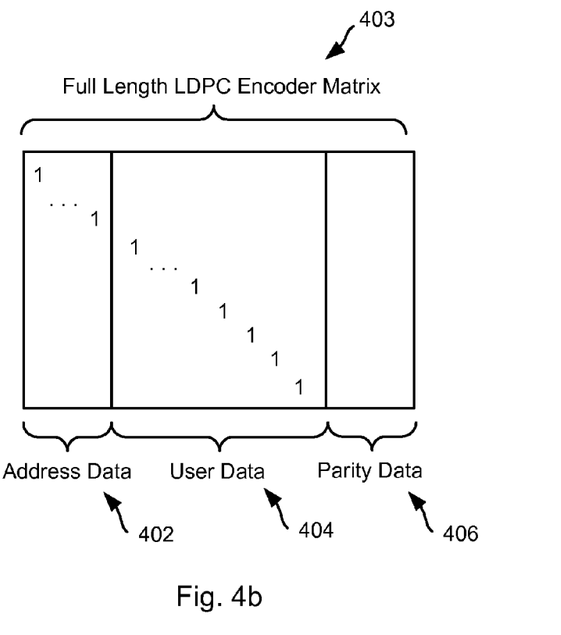
Figure 4C:
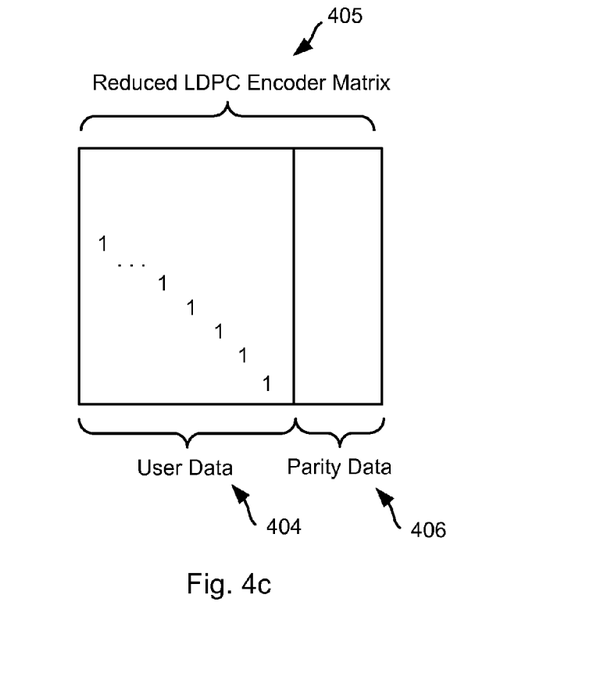

The combination of data input 202 and address data 261 is encoded by address efficient data encoder circuit 206 to yield an encoded data set 251. The encoded data set includes parity bits computed by address efficient data encoder circuit 206 based upon both the received user data and address data. The parity bits may be computed using any parity encoding approach and/or circuitry known in the art. FIG. 4b depicts an example encoded data set 403 including address data 402, user data 404, and parity data 406. In addition, address efficient data encoder circuit 206 strips the address data from the encoded data set to yield a reduced data set 251. FIG. 4c depicts an example reduced data set 405 where the address data is removed leaving only user data 404 and parity data 406. Of note, parity data 406 were calculated based upon user data 404 and the now removed address data. Hence, parity data 406 does not result in proper parity checks in reduced data set 405.

Reduced data set 251 is provided to a codeword scrambling circuit 207 that rearranges the order of reduced data set 251 to yield a scrambled data set 252. In transferring data across a channel there is a possibility that local regions of the data will become corrupt due to, for example, electronics noise and/or media defects. Such localized corruption is often referred to as burst errors. By scrambling the data, the effects of localized data corruption can be spread across a wider range of the data set increasing the possibility that error correction in a down stream data decoder may be recoverable. Said another way, burst errors corrupt a large number of successive bits that without adjustment may overwhelm a downstream data decoder circuit. To avoid overwhelming the data decoder circuit, codeword scrambling circuit 207 distributes data from any given row across the larger data set.

Scrambled data set 251 is provided to a pre-processing circuit 208 that may convert the output from a digital output to an analog output satisfactory for writing to a physical storage medium 220. Pre-processing circuit 208 may be any circuit known in the art that is capable of preparing digital data for output to physical storage medium 220. Physical storage medium 220 may be, but is not limited to, a magnetic disk. Based on the disclosure provided herein, one of ordinary skill in the art will recognize a variety of physical storage media that may be used in relation to different embodiments of the present invention.

When a read occurs, scrambled data set 252 is sensed from physical storage medium 220 by a post-processing circuit 222. Post processing circuit 222 is operable to sense information on physical storage medium 220 and to provide a corresponding series of digital samples 253. Post processing circuit 222 may include, for example, a read/write head assembly (not shown), a pre-amplifier circuit (not shown), an analog filter circuit (not shown), and an analog to digital converter circuit (not shown). Based upon the disclosure provided herein, one of ordinary skill in the art will recognize a variety of circuits and approaches that may be used in relation to different embodiments of the present invention for converting information sensed from physical storage medium 220 to digital samples 253.

Digital samples 253 are provided to an address efficient data processing circuit 210. In addition, address information 262 corresponding to the read data is generated by data read/write control circuit 230. Address efficient data processing circuit 210 re-incorporates the previously removed address data and performs one or more data decoder/detector processes in an attempt to recover the originally written data set. Once recovered, the originally written data set is provided as a data output 226.

Figure 3:
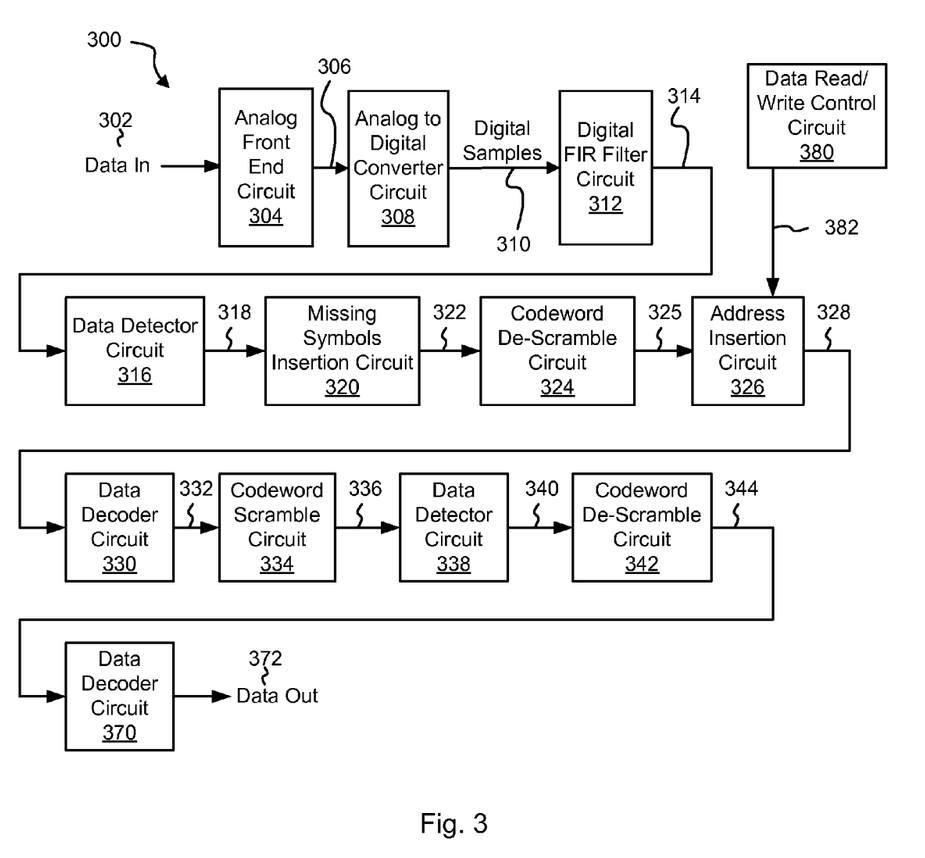
FIG. 3 shows one embodiment of an address efficient address decoding circuit in accordance with some embodiments of the present invention.

Turning to FIG. 3, an embodiment of an address efficient address decoding circuit 300 is shown in accordance with some embodiments of the present invention. Address efficient address decoding circuit 300 includes an analog front end circuit 304 that receives an analog data input 302. Analog data input 302 may be derived from, for example, a storage medium. Such a storage medium may be, for example, a magnetic storage disk. Based upon the disclosure provided herein, one of ordinary skill in the art will recognize a variety of storage media or other sources from which analog input signal 302 may be derived. Analog front end circuit 304 processes analog input signal 302 and provides a processed analog signal 306 to an analog to digital converter circuit 308. Analog front end circuit 304 may include, but is not limited to, an analog filter and an amplifier circuit as are known in the art. Based upon the disclosure provided herein, one of ordinary skill in the art will recognize a variety of circuitry that may be included as part of analog front end circuit 304.

Analog to digital converter circuit 308 converts processed analog signal 306 into a corresponding series of digital samples 310 synchronous to a synchronization clock (not shown). Analog to digital converter circuit 308 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention.

Digital samples 310 are provided to an equalizer circuit 312. In the depicted embodiment, equalizer circuit 312 is a digital finite impulse response filter as are known in the art. Based upon the disclosure provided herein, one of ordinary skill in the art will recognize a variety of equalizer circuits that may be used in relation to different embodiments of the present invention. Equalizer circuit 312 provides a filtered output 314 to a data detector circuit 316. Data detector circuit 316 applies a detection algorithm to the received input to yield a detected output 318. Data detector circuit 316 may be any type of data detector circuit known in the art including, but not limited to, a soft output Viterbi algorithm detector (SOVA) or a maximum a posteriori (MAP) detector. Based on the disclosure provided herein, one of ordinary skill in the art will recognize a variety of data detector circuits that may be used in accordance with different embodiments of the present invention.

Detected output 318 is provided to a missing symbols insertion circuit 320. Missing symbols insertion circuit 320 is operable to reform the received codeword (i.e., detected output 318) into a defined codeword format that is larger than that represented by detected output 318. This includes padding detected output 318 with a number of dummy symbols that do not affect the parity checks embodies in detected output 318 to make a padded codeword 322 that matches the size expected by a downstream data decoder circuit (i.e., a decoder circuit 330). In particular, the same full H matrix may be used for encoding and decoding user data. In such cases, excess area may be padded with known user symbols (e.g., [00] or [11]) during encoding. The corresponding symbol log likelihood (Lx=log Pr(A=x)) is set to 0 for x=[00] or [11] and set to a maximum for other symbol values while decoding. Therefore, the normalized log likelihood ratio inside the decoder circuit (LLRx=Lx−min{Lx}) is set to 0 for x=[00] or [11] and set to the maximum for other symbol values. These shortened user symbols are called missing symbols. Missing symbol insertion is as uniform as possible across all the encoded user streams. The missing symbols in the detector domain are at known pre-deterministic locations that can be computed. It should be noted that while much of the disclosure refers to operation on two-bit missing symbols, the embodiments described may be modified to work on single bit missing symbols, or missing symbols exhibiting three or more bits.

Figure 5A:
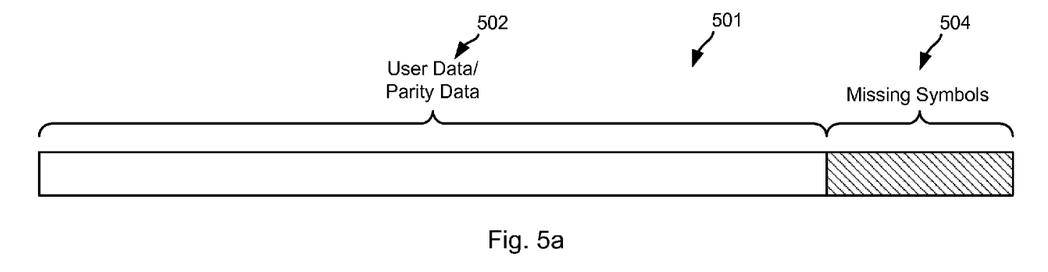
FIGS. 5a-5c graphically depict processing of a stored data set in accordance with one or more embodiments of the present invention.

FIG. 5a depicts an example of a padded codeword 501 where a number of missing symbols 504 are appended to user data/parity data 502. Padded data set 501 is a simplified example where all of the missing symbols are added at one area. As more fully discussed below, in other embodiments, the missing symbols may be more uniformly distributed across the codeword.

Figure 5B:
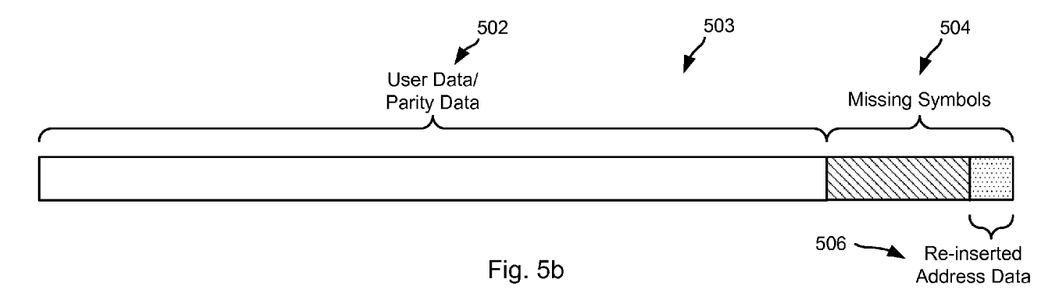

Padded codeword 322 is provided to a codeword de-scramble circuit 324. Codeword de-scramble circuit 324 re-assembles the codeword into the format of the originally encoded data set before it was scrambled prior to being written (e.g., reversing the scrambling applied by codeword scrambling circuit 207). Codeword de-scramble circuit 324 provides a resulting de-scrambled output 325 to an address insertion circuit 326. In addition, a data read/write control circuit 380 provides the original address data 382 to address insertion circuit 326. Address insertion circuit 326 overwrites some of the previously appended missing symbols with original address data 382 to yield an address added codeword 328 (also referred to herein as an expanded codeword). FIG. 5b depicts an example of an address added codeword 503 where part of missing symbols 504 that were appended to user data/parity data 502 are overwritten by re-inserted address data 506.

Address added codeword 328 is provided to a data decoder circuit 330. Of note, the parity included in address added codeword 328 was originally calculated based both on the address and user data. Thus, with the address inserted, address added codeword 328 will conform to the parity checking applied by data decoder circuit 330. Data decoder circuit 330 may be any circuit known in the art capable of performing a parity based data decode algorithm on a received data set. In one particular embodiment of the present invention, data decoder circuit 330 is a low density parity check (LDPC) circuit as are known in the art. Decoder circuit 330 applies the decoding algorithm to address added codeword 328 to yield a decoded output 332.

Figure 5C:
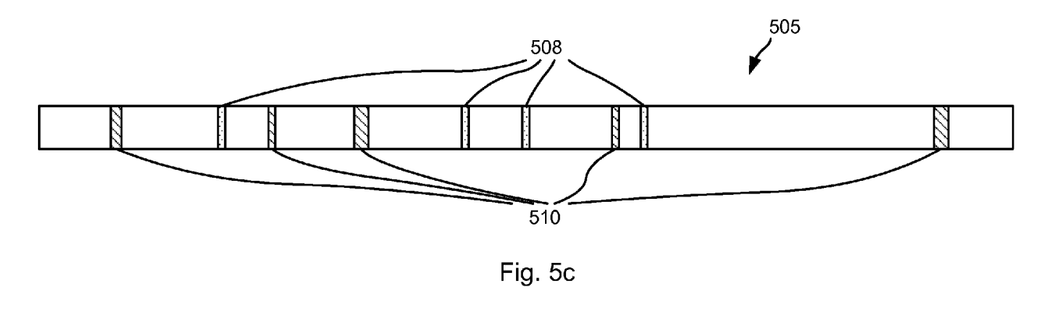

Decoded output 332 is provided to a codeword scramble circuit 334 that rearranges the order of decoded output to yield a scrambled data set 336. As previously mentioned, data sets may be subject to localized or burst errors due to, for example, electronics noise and/or media defects. By scrambling the data, the effects of localized data corruption can be spread across a wider range of the data set increasing the possibility that error correction in a down stream data decoder may be recoverable. FIG. 5c depicts an example of scrambled data set 336. In particular, FIG. 5c shows a codeword 505 that includes portions of missing symbols 504 redistributed as portions 510 across codeword 505, and portions of re-inserted address data 506 redistributed as portions 508 across codeword 505.

Scrambled data set 336 is provided to a data detector circuit 338 that applies a data detection algorithm to the received data set to yield a detected output 340. Data detector circuit 340 may be any type of data detector circuit known in the art including, but not limited to, a soft output Viterbi algorithm detector (SOVA) or a maximum a posteriori (MAP) detector. Based on the disclosure provided herein, one of ordinary skill in the art will recognize a variety of data detector circuits that may be used in accordance with different embodiments of the present invention.

Detected output 340 is provided to a codeword de-scramble circuit 342. Codeword de-scramble circuit 342 re-assembles the codeword into the format that existed before codeword scramble circuit 334. Codeword de-scramble circuit 342 provides a resulting de-scrambled output 344 to a data decoder circuit 370. Data decoder circuit 370 may be any circuit known in the art capable of performing a parity based data decode algorithm on a received data set. In one particular embodiment of the present invention, data decoder circuit 370 is a low density parity check (LDPC) circuit as are known in the art. Decoder circuit 370 applies the decoding algorithm to de-scrambled output 344 to yield a decoded output 372.

It should be noted that while address efficient address decoding circuit 300 uses two stages of a data detector and data decoder (i.e., data detector circuit 316 and data decoder circuit 330 forming the first stage, and data detector circuit 338 and data decoder circuit 370 forming the second stage), that the approach of removing the address data in a pre-write encode stage and re-instating the address data in a post write decode stage may be applied to other architectures. For example, the inventions disclosed herein may be modified for application to a variable stage architecture such as that described in U.S. patent application Ser. No. 12/114,462 entitled "Systems and Methods for Queue Based Data Detection and Decoding" and filed May 2, 2008 by Yang et al. where a variable number of data detection/data decode stages are supported for a given codeword, or in U.S. patent application Ser. No. 12/785,413 entitled "Systems and Methods for Decoder Sharing Between Data Sets" filed May 21, 2010 by Gunnam. The entirety of both of the aforementioned references are incorporated herein for all purposes.

Figure 6:
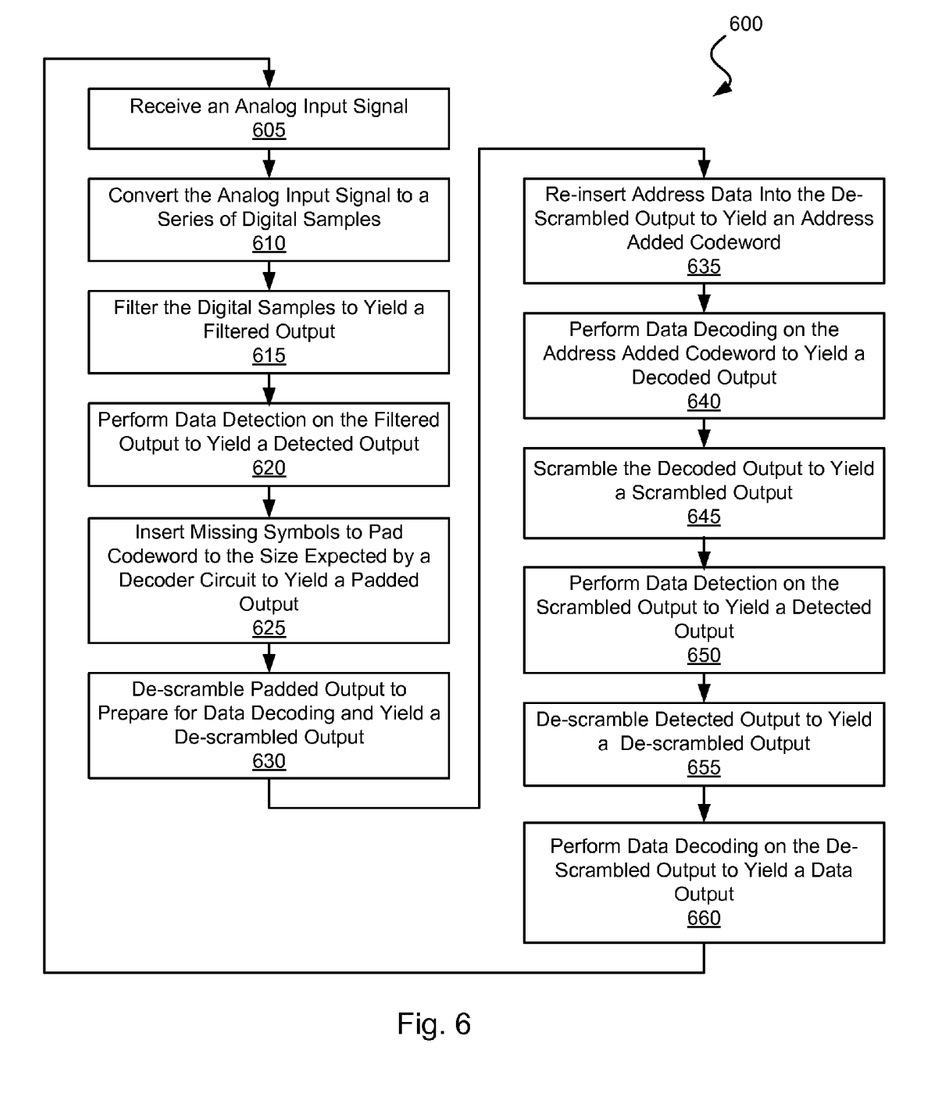
FIG. 6 is a flow diagram of a method in accordance with some embodiments of the present invention for format efficient storage addressing.

Turning to FIG. 6, a flow diagram 600 of a method in accordance with some embodiments of the present invention for format efficient storage addressing is described. Following flow diagram 600, an analog input signal is received (block 605). Analog input signal includes various information including, but not limited to, user data to be processed. The analog input signal may be received, for example, from a read/write head assembly that senses information from a storage medium. Based upon the disclosure provided herein, one of ordinary skill in the art will recognize a variety of sources of the analog input signal. The analog input signal is converted to a series of digital samples using an analog to digital converter circuit (block 610). The series of digital samples are synchronous to a sampling clock, and represent a value of the analog input signal at each particular sampling instant. Based upon the disclosure provided herein, one of ordinary skill in the art will recognize a variety of analog to digital conversion processes that may be applied in accordance with different embodiments of the present invention.

The series of digital samples are filtered using a digital finite impulse response filter to yield a filtered output (block 615). A data detection algorithm is applied to the filtered output to yield a detected output (block 620). The data detection algorithm may be, for example, a maximum a posteriori data detection algorithm or a Viterbi algorithm data detection as are known in the art. Of note, the data upon which the data detection is applied was previously scrambled to reduce the impact of localized or burst errors. Missing symbols are inserted into the detected output to make the detected output the size expected by a downstream decoder process (block 625). The resulting output is referred to as a padded output. The padded output is then de-scrambled to yield a de-scrambled output (block 630). The de-scrambling is done to reverse the scrambling originally applied to reduce the impact of localized or burst errors. It should be note that the order of the processes represented by blocks 625, 630 can be reversed.

An address originally associated with the codeword during encoding is re-inserted into the de-scrambled output to yield an address added codeword (block 635). This address insertion overwrites some of the previously appended missing symbols with the original address data. Data decoding is then applied to the address added codeword to yield a decoded output (block 640). Of note, the parity included in the address added codeword was originally calculated based both on the address and user data. Thus, with the address inserted, the address added codeword will conform to the parity checking applied by during the data decoding process. The data decoding process may be any circuit known in the art capable of performing a parity based data decode algorithm on a received data set. In one particular embodiment of the present invention, the data decoding process is a low density parity check (LDPC) circuit as are known in the art.

The decoded output is then scrambled to reduce the impact of any localized or burst error, yielding a scrambled output (block 645). The scrambling is done in a reversible manner. A data detection algorithm is applied to the scrambled output to yield a detected output (block 650). The data detection algorithm may be, for example, a maximum a posteriori data detection algorithm or a Viterbi algorithm data detection as are known in the art. The detected output is then de-scrambled to yield a de-scrambled output (block 655). The de-scrambling is the reverse of the scrambling performed in block 645, and prepares the output for data decoding. Data decoding is then applied to the de-scrambled output to yield a data output (block 660). The data decoding process may be any circuit known in the art capable of performing a parity based data decode algorithm on a received data set. In one particular embodiment of the present invention, the data decoding process is a low density parity check (LDPC) circuit as are known in the art.

Figure 7:
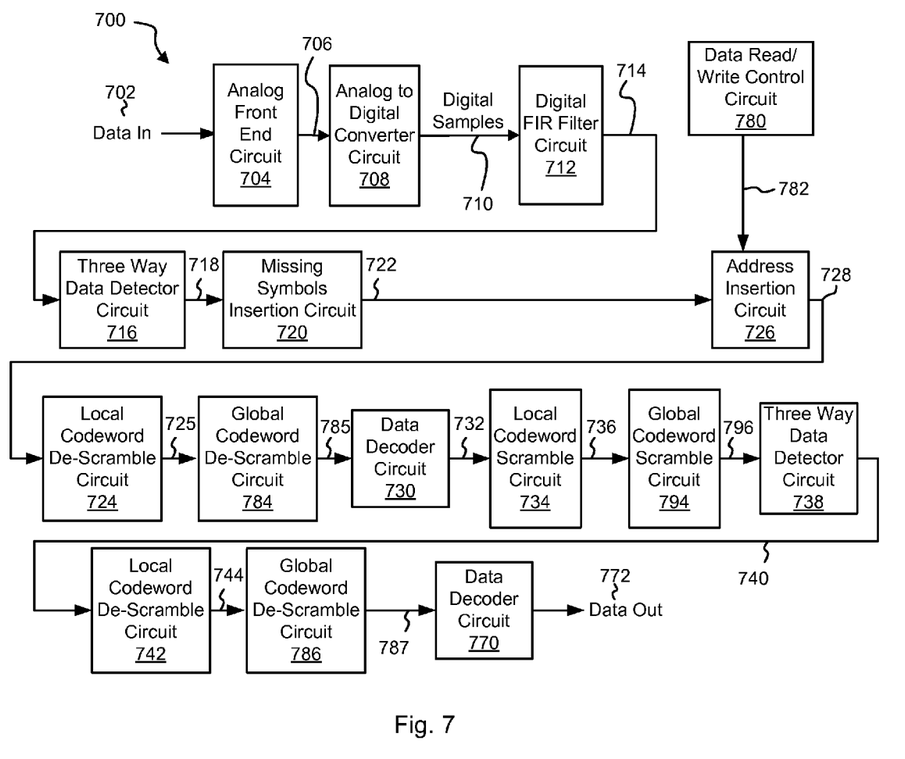
FIG. 7 shows an embodiment of a portion of an address efficient address decoding circuit using both local and global iterations (implying both local and global scrambling) in accordance with various embodiments of the present invention.

The above described and referenced architectures may use both local iterations and global iterations in their processing. Where both local and global iterations are used, the operation of address efficient data processing circuit 210 may be modified to take advantage of both types of iterations. Turning to FIG. 7, an embodiment of another address efficient address decoding circuit 700 using both local and global iterations (implying both local and global scrambling) is shown in accordance with various embodiments of the present invention. Address efficient address decoding circuit 700 includes an analog front end circuit 704 that receives an analog data input 702. Analog data input 702 may be derived from, for example, a storage medium. Such a storage medium may be, for example, a magnetic storage disk. Based upon the disclosure provided herein, one of ordinary skill in the art will recognize a variety of storage media or other sources from which analog input signal 702 may be derived. Analog front end circuit 704 processes analog input signal 702 and provides a processed analog signal 706 to an analog to digital converter circuit 708. Analog front end circuit 704 may include, but is not limited to, an analog filter and an amplifier circuit as are known in the art. Based upon the disclosure provided herein, one of ordinary skill in the art will recognize a variety of circuitry that may be included as part of analog front end circuit 704.

Analog to digital converter circuit 708 converts processed analog signal 706 into a corresponding series of digital samples 710 synchronous to a synchronization clock (not shown). Analog to digital converter circuit 708 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention.

Figure 8A:
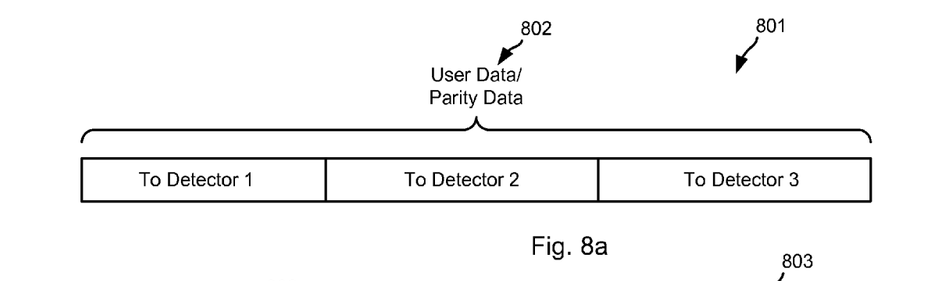
FIGS. 8a-8f graphically depict processing of a stored data set in accordance with one or more embodiments of the present invention.

Digital samples 710 are provided to an equalizer circuit 712. In the depicted embodiment, equalizer circuit 712 is a digital finite impulse response filter as are known in the art. Based upon the disclosure provided herein, one of ordinary skill in the art will recognize a variety of equalizer circuits that may be used in relation to different embodiments of the present invention. Equalizer circuit 712 provides a filtered output 714 to a three way data detector circuit 716. Three way data detector circuit 716 includes three independent detector circuits that each process one third of a received codeword. Each of the three data detector circuits applies a detection algorithm to a respective one third of the received codeword to yield a respective partial detected output 718. Data detector circuit 716 may include any type of data detector circuits known in the art including, but not limited to, a soft output Viterbi algorithm detector (SOVA) or a maximum a posteriori (MAP) detector. Based on the disclosure provided herein, one of ordinary skill in the art will recognize a variety of data detector circuits that may be used in accordance with different embodiments of the present invention. Data detector circuit 716 re-assembles the respective partial detected outputs to yield a detected output 718. FIG. 8*a* shows an example codeword 801 having a user data/parity data 802 split into three portions (to detector 1, to detector 2, and to detector 3) that are processed by the respective data detector circuits included as part of data detector circuit 716.

Figure 8B:
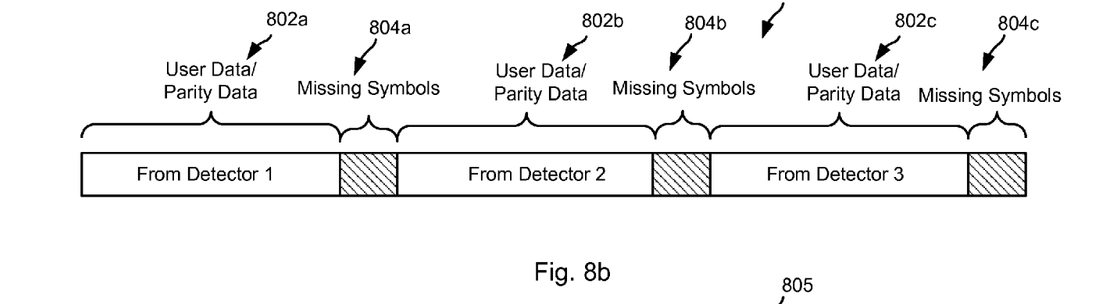

Detected output 718 is provided to a missing symbols insertion circuit 720. Missing symbols insertion circuit 720 is operable to reform the received codeword (i.e., detected output 718) into a defined codeword format that is larger than that represented by detected output 718. This includes padding each of the portions of detected output 718 with a number of dummy symbols that do not affect the parity checks embodies in detected output 718 to make an interim padded codeword 722 that matches the size expected by a downstream data decoder circuit (i.e., a decoder circuit 730). In particular, the same full H matrix may be used for encoding and decoding user data. In such cases, excess area may be padded with known user symbols (e.g., [00] or [11]) during encoding. The corresponding symbol log likelihood (Lx=log Pr(A=x)) is set to 0 for x=[00] or [11] and set to a maximum for other symbol values while decoding. Therefore, the normalized log likelihood ratio inside the decoder circuit (LLRx=Lx−min{Lx}) is set to 0 for x=[00] or [11] and set to the maximum for other symbol values. These shortened user symbols are called missing symbols. Missing symbol insertion is as uniform as possible across all the encoded user streams. The missing symbols in the detector domain are at known pre-deterministic locations that can be computed. FIG. 8*b* depicts an example of an interim padded codeword 801 where a number of missing symbols 804 are appended to respective portions of user data/parity data 802.

Figure 8C:
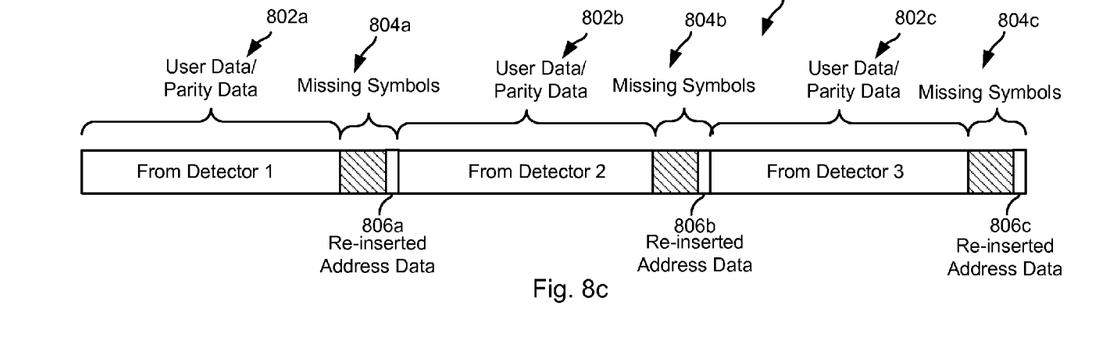

Interim padded codeword 722 is provided to an address insertion circuit 726. In addition, a data read/write control circuit 780 provides the original address data 782 to address insertion circuit 726. Address insertion circuit 726 overwrites some of the previously appended missing symbols with original address data 782 to yield an interim address added codeword (also referred to herein as an expanded codeword). FIG. 8c depicts an example of an interim address added codeword 805 where part of missing symbols 804 that were appended to user data/parity data 802 are overwritten by re-inserted address data 806.

Figure 8D:
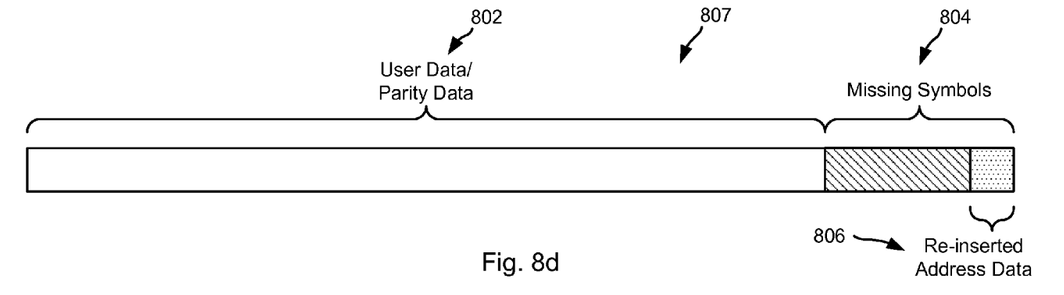

Address insertion circuit 726 re-arranges the interim address added codeword to yield an address added codeword 728 where all of the missing symbols and address data are gathered in a common area of the codeword. This may include, for example, gathering the address information at one end of the codeword next to the missing symbols with the other end of the codeword comprising user data and parity information. FIG. 8d shows an example of an address added codeword 807 where missing symbols 804 and reinserted address data 806 is gathered together at one end of the codeword, and user data/parity data 802 is gathered together at the other end of the codeword.

Figure 8E:
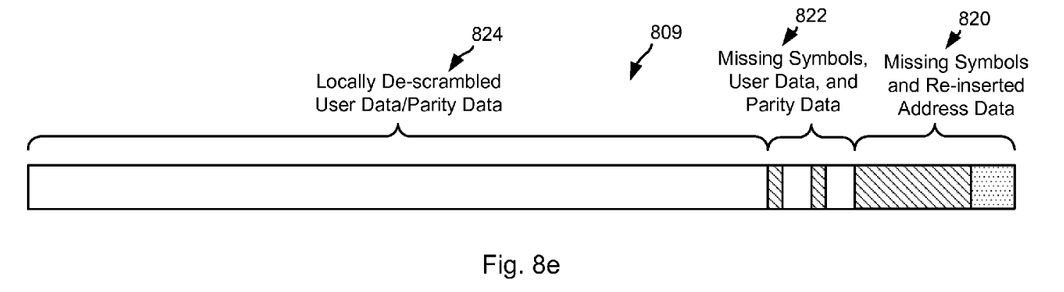

Address added codeword 728 is provided to a local codeword de-scramble circuit 724. Local codeword de-scramble circuit 724 re-assembles local portions (e.g., 24-bit portions) of the codeword into the arrangement of the originally encoded data set before it was scrambled prior to being written (e.g., partially reversing the scrambling applied by codeword scrambling circuit 207). Local codeword de-scramble circuit 724 provides a resulting local de-scrambled output 725 to a global codeword de-scramble circuit 784. FIG. 8e shows an example of a local de-scrambled output codeword 809 where local portions (e.g., 24 bit portions) are de-scrambled. As shown, a region of locally de-scrambled user data/parity data 824, a region of inter-mixed, locally de-scrambled missing symbols and user data/parity data 822, and a region of locally de-scrambled missing symbols and re-inserted address data 820 exist. Of note, in some cases the re-inserted address data is not allowed to be mixed with the missing symbols during the local de-scrambling to assure that the re-inserted address bits are always in a common location.

Figure 8F:
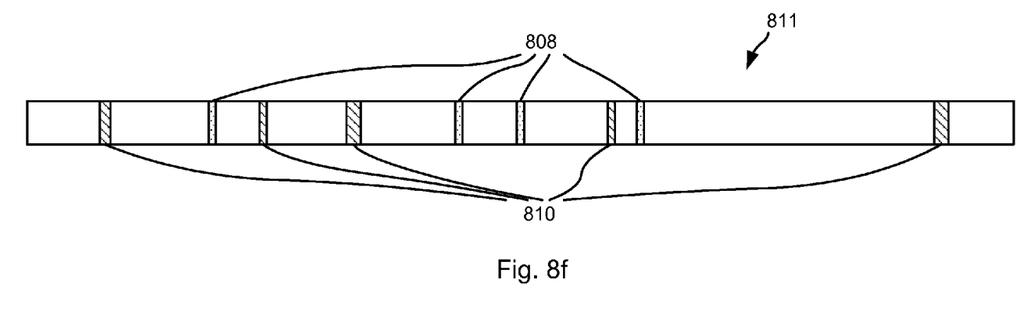

Global codeword de-scramble circuit 784 re-arranges the locally de-scrambled portions to provide the codeword as would be expected by the downstream decoder circuit (i.e., data decoder circuit 730). The result is provided as a decoder ready codeword 785. FIG. 8f shows an example of a decoder ready codeword 811 with missing symbols 810, and address information 808 dispersed throughout the codeword as would be expected by data decoder circuit 730. Decoder ready codeword 785 is provided to data decoder circuit 730. Of note, the parity included in address decoder ready codeword 785 was originally calculated based both on the address and user data. Thus, with the address inserted and the data re-arranged to match the originally encoded codeword, decoder ready codeword 728 will conform to the parity checking applied by data decoder circuit 730. Data decoder circuit 730 may be any circuit known in the art capable of performing a parity based data decode algorithm on a received data set. In one particular embodiment of the present invention, data decoder circuit 730 is a low density parity check (LDPC) circuit as are known in the art. Decoder circuit 730 applies the decoding algorithm to address added codeword 728 to yield a decoded output 732.

Decoded output 732 is provided to a local codeword scramble circuit 734 that rearranges the order of decoded output to yield a scrambled data set 736 and a global codeword scramble circuit 794 that receives scrambled data set 736 and provides a scrambled data set 796 to include both global and local scrambling (i.e., the opposite of the de-scrambling implemented by local codeword de-scramble circuit 724 and global codeword de-scramble circuit 784). As previously mentioned, data sets may be subject to localized or burst errors due to, for example, electronics noise and/or media defects. By scrambling the data, the effects of localized data corruption can be spread across a wider range of the data set increasing the possibility that error correction in a down stream data decoder may be recoverable.

Scrambled data set 736 is provided to a three way data detector circuit 738 that applies a data detection algorithm to the received data set to yield a detected output 740. Three way data detector circuit 738 includes three independent detector circuits that each process one third of a received codeword. Each of the three data detector circuits applies a detection algorithm to a respective one third of the received codeword to yield a respective partial detected output 740. Data detector circuit 738 may include any type of data detector circuits known in the art including, but not limited to, a soft output Viterbi algorithm detector (SOVA) or a maximum a posteriori (MAP) detector. Based on the disclosure provided herein, one of ordinary skill in the art will recognize a variety of data detector circuits that may be used in accordance with different embodiments of the present invention. Data detector circuit 738 re-assembles the respective partial detected outputs to yield a detected output 740.

Detected output 740 is provided to a local codeword de-scramble circuit 742. Local codeword de-scramble circuit 742 re-assembles local portions (e.g., 24-bit portions) of the codeword into the arrangement of the originally encoded data set before it was scrambled prior to being written (e.g., partially reversing the scrambling applied by codeword scrambling circuit 207). Local codeword de-scramble circuit 742 provides a resulting local de-scrambled output 744 to a global codeword de-scramble circuit 786. Global codeword de-scramble circuit 786 re-arranges the locally de-scrambled portions to provide the codeword as would be expected by the downstream decoder circuit (i.e., data decoder circuit 770). The result is provided as a decoder ready codeword 787. Decoder ready codeword 787 is provided to data decoder circuit 770. Of note, the parity included in address decoder ready codeword 787 was originally calculated based both on the address and user data. Thus, with the address inserted and the data re-arranged to match the originally encoded codeword, decoder ready codeword 787 will conform to the parity checking applied by data decoder circuit 770. Data decoder circuit 770 may be any circuit known in the art capable of performing a parity based data decode algorithm on a received data set. In one particular embodiment of the present invention, data decoder circuit 770 is a low density parity check (LDPC) circuit as are known in the art. Decoder circuit 770 applies the decoding algorithm to decoder ready codeword 787 to yield a data output 772.

It should be noted that while address efficient address decoding circuit 700 uses two stages of a data detector and data decoder (i.e., data detector circuit 716 and data decoder circuit 730 forming the first stage, and data detector circuit 738 and data decoder circuit 770 forming the second stage), that the approach of removing the address data in a pre-write encode stage and re-instating the address data in a post write decode stage may be applied to other architectures. For example, the inventions disclosed herein may be modified for application to a variable stage architecture such as that described in U.S. patent application Ser. No. 12/114,462 entitled "Systems and Methods for Queue Based Data Detection and Decoding" and filed May 2, 2008 by Yang et al. where a variable number of data detection/data decode stages are supported for a given codeword, or in U.S. patent application Ser. No. 12/785,413 entitled "Systems and Methods for Decoder Sharing Between Data Sets" filed May 21, 2010 by Gunnam. Both of the aforementioned references were previously incorporated herein for all purposes.

It should be noted that the various blocks discussed in the above application may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for data addressing. While detailed descriptions of one or more embodiments of the invention have been given above, various alternatives, modifications, and equivalents will be apparent to those skilled in the art without varying from the spirit of the invention. For example, while much of the disclosure refers to operation on two-bit missing symbols, the embodiments described may be modified to work on single bit missing symbols, or missing symbols exhibiting three or more bits. Therefore, the above description should not be taken as limiting the scope of the invention, which is defined by the appended claims.

What is claimed is:

1. A data storage device, the data storage device comprising:
    a storage medium;
    a read/write head assembly disposed in relation to the storage medium and operable to:
        write a stored codeword to the storage medium; and
        sense information corresponding to the stored codeword as an encoded codeword;
    a read channel circuit operable to receive the encoded codeword, and including:
        a missing symbols insertion circuit, a codeword de-scramble circuit, and an address insertion circuit that together are operable to pad a derivative of the encoded codeword with a plurality of symbols, to de-scramble the derivative of the encoded codeword, and to insert address information corresponding to the derivative of the encoded codeword to yield a modified encoded codeword; and
        a data decoder circuit operable to apply a data decoding algorithm to the modified encoded codeword to yield a decoded output.

2. The data storage device of claim 1, the data storage device further comprising:
    a data detector circuit operable to perform a data detection algorithm on the encoded codeword to yield a detected output, wherein the detected output is the derivative of the encoded codeword.

3. The data storage device of claim 2, wherein the detected output is a first detected output, the data detector circuit is a first data detector circuit, the codeword de-scramble circuit is a first codeword de-scramble circuit, and the data decoder circuit is a first data decoder circuit; the data storage device further comprising:
    a codeword scramble circuit operable to scramble the decoded output to yield a scrambled output;
    a second data detector circuit operable to perform the data detection algorithm on the scrambled output to yield a second a detected output;
    a second codeword de-scramble circuit operable to reverse the scrambling applied by the codeword scramble circuit to yield a de-scrambled output; and
    a second data decoder circuit operable to apply the data decoding algorithm to the de-scrambled output yield a data output.

4. The data storage device of claim 1, the data storage device further comprises:
    an address efficient data encoder circuit operable to calculate parity data based at least in part on a user data set and the address information, and to remove the address information to yield an address reduced codeword.

5. The data storage device of claim 4, the data storage device further comprises:
    a codeword scramble circuit operable to scramble the address reduced codeword to yield the encoded codeword.

6. The data storage device of claim 1, wherein the missing symbols insertion circuit is operable to pad the derivative of the encoded codeword with a plurality of symbols to yield a padded codeword, wherein the codeword de-scramble circuit is operable to de-scramble the padded codeword to yield a de-scrambled codeword, and wherein the address insertion circuit is operable to insert the address information over one or more of the plurality of symbols to yield the modified encoded codeword.

7. The data storage device of claim 1, wherein the codeword de-scramble circuit is operable to perform both a global de-scrambling process and a local de-scrambling process.

8. The data storage device of claim 1, wherein the missing symbols insertion circuit is operable to pad the derivative of the encoded codeword with a plurality of symbols to yield a padded codeword, wherein the codeword de-scramble circuit is operable to perform both a local de-scramble process and a global de-scramble process on the padded codeword to yield a de-scrambled codeword, and wherein the address insertion circuit is operable to insert the address information over one or more of the plurality of symbols to yield the modified encoded codeword.

9. The data storage device of claim 1, wherein the missing symbols insertion circuit is operable to pad the derivative of the encoded codeword with a plurality of symbols to yield a padded codeword, wherein the address insertion circuit is operable to insert the address information over one or more of the plurality of symbols to yield an address modified codeword; and the codeword de-scramble circuit is operable to de-scramble the padded codeword to yield a de-scrambled codeword.

10. An address efficient data read circuit, the data read circuit comprising:
    a data detector circuit operable to process an encoded codeword to yield a detected codeword, wherein the encoded codeword includes parity information calculated based on both user data and address data, and wherein the encoded codeword has address data removed;

a combination of a missing symbols insertion circuit, a codeword de-scramble circuit, and an address insertion circuit that together are operable to receive the detected codeword, to pad the detected codeword with a plurality of symbols, to de-scramble the detected codeword, and to insert the address data corresponding to yield a modified codeword; and a data decoder circuit operable to apply a data decoding algorithm to the modified codeword to yield a decoded output.

11. The circuit of claim 10, wherein the circuit is implemented as an integrated circuit.

12. The circuit of claim 10, wherein the circuit is implemented as part of a data storage device.

13. The circuit of claim 10, wherein the detected output is a first detected output; wherein the data detector circuit is a first data detector circuit, the codeword de-scramble circuit is a first codeword de-scramble circuit, and the data decoder circuit is a first data decoder circuit; and wherein the circuit further comprises:

a codeword scramble circuit operable to scramble the decoded output to yield a scrambled output;

a second data detector circuit operable to receive the scrambled output and to provide a corresponding second detected output;

a second codeword de-scramble circuit operable to reverse the scrambling applied by the codeword scramble circuit to yield a de-scrambled output; and a second data decoder circuit operable to apply the data decoding algorithm to the de-scrambled output yield a data output.

14. The circuit of claim 10, wherein the missing symbols insertion circuit is operable to pad the derivative of the encoded codeword with a plurality of symbols to yield a padded codeword, wherein the codeword de-scramble circuit is operable to de-scramble the padded codeword to yield a de-scrambled codeword, and wherein the address insertion circuit is operable to insert the address information over one or more of the plurality of symbols to yield the modified encoded codeword.

15. The circuit of claim 10, wherein the missing symbols insertion circuit is operable to pad the derivative of the encoded codeword with a plurality of symbols to yield a padded codeword, wherein the codeword de-scramble circuit is operable to perform both a local de-scramble process and a global de-scramble process on the padded codeword to yield a de-scrambled codeword, and wherein the address insertion circuit is operable to insert the address information over one or more of the plurality of symbols to yield the modified encoded codeword.

16. The circuit of claim 10, wherein the missing symbols insertion circuit is operable to pad the derivative of the encoded codeword with a plurality of symbols to yield a padded codeword, wherein the address insertion circuit is operable to insert the address information over one or more of the plurality of symbols to yield an address modified codeword; and the codeword de-scramble circuit is operable to de-scramble the padded codeword to yield a de-scrambled codeword.

17. The circuit of claim 10, the circuit further comprising:

an address efficient data encoder circuit operable to calculate parity data based at least in part on a user data set and address information, and to remove the address information to yield an address reduced codeword; and a codeword scramble circuit operable to scramble the address reduced codeword to yield the encoded codeword.

18. The circuit of claim 10, wherein the data decoder circuit is a low density parity check decoder circuit.

19. The circuit of claim 10, wherein the data detector circuit is selected from a group consisting of: a maximum a posteriori data detector circuit and a Viterbi algorithm detector circuit.

20. A method for format efficient data storage, the method comprising:

encoding a combination of a data set and an address to yield an encoded codeword;

removing the address from the encoded codeword to yield a reduced data set;

receiving the reduced data set;

padding a derivative of the reduced data set with a plurality of symbols, de-scrambling the derivative of the reduced data set, and inserting address information corresponding to the derivative of the reduced data set to yield a modified encoded codeword; and decoding the modified encoded codeword to yield a decoded output.

* * * * *